(12) United States Patent
Li et al.

(10) Patent No.: US 10,887,790 B2
(45) Date of Patent: Jan. 5, 2021

(54) METHOD FOR SENDING BUFFER STATUS REPORT AND USER EQUIPMENT (71) Applicant: Huawei Technologies Co., Ltd., Shenzhen (CN)

(72) Inventors: Hong Li, Shanghai (CN); Feng Han, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/410,865

(22) Filed: May 13, 2019

(65) Prior Publication Data
US 2019/0281493 A1 Sep. 12, 2019

Related U.S. Application Data (63) Continuation of application No. PCT/CN2018/090133, filed on Jun. 6, 2018.

(30) Foreign Application Priority Data

Jun. 16, 2017 (CN) .......................... 2017 1 0459268

(51) Int. Cl.
H04W 28/02 (2009.01)
H04W 24/10 (2009.01)
H04W 72/12 (2009.01)

(52) U.S. Cl.
CPC ....... *H04W 28/0278* (2013.01); *H04W 24/10* (2013.01); *H04W 72/1284* (2013.01)

(58) Field of Classification Search
CPC . H04W 28/0278; H04W 24/10; H04W 24/00; H04W 72/04; H04W 88/08;
(Continued)

(56) References Cited

U.S. PATENT DOCUMENTS

2012/0099452 A1* 4/2012 Dai ................... H04W 72/1221
370/252
2013/0058220 A1 3/2013 Yi et al.
(Continued)

FOREIGN PATENT DOCUMENTS

CN 101932019 A 12/2010
CN 102291760 A 12/2011
(Continued)

OTHER PUBLICATIONS

3GPP TSG-RAN WG2 Meeting #98, R2-1705311, ASUSTEK, DIscussion on BSR in NR (Year: 2017).*
(Continued)

*Primary Examiner* — Hardikkumar D Patel
(74) *Attorney, Agent, or Firm* — Leydig, Voit & Mayer, Ltd.

(57) ABSTRACT

A method for sending a buffer status report (BSR) includes: generating, by a user equipment (UE), the BSR, wherein the BSR includes a buffer index of at least one of eight logic channel groups (LCGs), wherein the buffer index of the LCG indicates an uplink buffer amount of the LCG, wherein the BSR occupies X bytes, wherein a buffer index of one LCG occupies N bits, and wherein X is an integer ranging from 1 to 17 and N is an integer ranging from 5 to 16 except that a case in which X is 1 and N is 6 at the same time does not exist; and sending, by the UE, the BSR to a network-side device.

25 Claims, 6 Drawing Sheets (58) Field of Classification Search
CPC ..... H04W 76/00; H04W 84/08; H04W 76/02; H04W 28/04; H04W 5/0007; H04W 48/08; H04W 74/08; H04W 12/413; H04L 47/10; H04L 47/15; H04L 47/70; H04L 47/35; H04L 47/30; H04L 47/32; H04L 43/50; H04L 47/50; H04L 12/2801
See application file for complete search history.

(56) References Cited

U.S. PATENT DOCUMENTS

| | | | |
|---|---|---|---|
| 2017/0188221 A1 | 6/2017 | Lee et al. | |
| 2018/0368023 A1* | 12/2018 | Hong | H04W 72/10 |
| 2019/0335357 A1* | 10/2019 | Shi | H04W 28/0252 |

FOREIGN PATENT DOCUMENTS

| | | | |
|---|---|---|---|
| CN | 103313396 A | 9/2013 | |
| CN | 106304370 A | 1/2017 | |
| CN | 106576336 A | 4/2017 | |
| WO | 2017052106 A1 | 3/2017 | |
| WO | WO-2018227483 A1 * | 12/2018 | H04W 48/08 |

OTHER PUBLICATIONS

3GPP TSG RAN WG2#98 R2-1705201, Huawei, HiSilicon, BSR Format (Year: 2017).*
3GPP TR 23.799 V14.0.0 (Dec. 2016);3rd Generation Partnership Project;Technical Specification Group Services and System Aspects;Study on Architecture for Next Generation System(Release 14);total 522 pages.
3GPP TSG-RAN2#87bis R2-144485, General Dynamics UK Ltd:"Forrnat of the ProSe-BSR", Shanghai, China, Oct. 6-10, 2014, total 4 pages.
3GPP TSG-RAN WG2 Meeting #97bis, R2-1703887, Qualcomm Incorporated:"Enhanced SR and BSR", (updated version of R2-1703671), Spoken, USA, Apr. 3-7, 2017, total 3 pages.
3GPP TS 38.321 V0.0.3 (May 2017);3rd Generation Partnership Project;Technical Specification Group Radio Access Network;NR;Mediurn Access Control (MAC) protocol specification(Release 15);total 20 pages.
3GPP TSG-RAN WG2 Meeting #87bis R2-144588, LG Electronics Inc.:"ProSe BSR format with support of more than 4 Groups", Oct. 6-10, 2014, Shanghai, China, Total 3 pages.
3GPP TSG-RAN WG2 Meeting #98 R2-1705311, ASUSTeK:"Discussion on BSR in NR",Revision of R2-1703227, Hangzhou, China, May 15-19, 2017, total 5 pages.
3GPP TS 38.322 V0.0.2(May 2017);3rd Generation Partnership Project;Technical Specification Group Radio Access Network;NR-;Radio Link Control (RLC) protocol specification (Release 15);total 18 pages.
3GPP TSG RAN WG2 #85bis R2-141800, Vice-Chairman (LG Electronics):" Report of the LTE UP ad hoc meeting", Mar. 31-Apr. 4, Valencia, Spain. Total 13 pages.
3GPP TS 38.323 V0.0.5 (May 2017);3rd Generation Partnership Project;Technical Specification Group Radio Access Network;NR;Packet Data Convergence Protocol (PDCP) specification (Release 15 );total 24 pages.
Huawel, HiSilicon,"BSR format",3GPP TSG-RAN WG2 #98 R2-1705201,Hangzhou, China, May 15-19, 2017,total 4 pages.
3GPP TS 38.300 V0.4.1 (Jun. 2017);3rd Generation Partnership Project;Technical Specification Group Radio Access Network;NR; NR and NG-RAN Overall Description:Stage 2(Release 15);total 55 pages.
"Discussion on BSR for NR," 3GPP TSG-RAN WG2 #98, R2-1705097, Hangzhou, China, XP51275574, pp. 1-2, 3rd Generation Partnership Project—Valbonne, France (May 15-19, 2017).
"Views on SR/BSR Enhancements," 3GPP TSG-RAN WG2 Meeting #98, R2-1705663, Hangzhou, China, XP51275977, pp. 1-4, 3rd Generation Partnership Project—Valbonne, France (May 15-19, 2017).
"BSR format," 3GPP TSG-RAN WG2 #98, R2-1705201, Hangzhou, China, XP51275677, pp. 1-4, 3rd Generation Partnership Project—Valbonne, France (May 15-19, 2017).
EP 18818960.9, Search Report, dated Jul. 23, 2019.
CN 2018107969300, Office Action, dated Aug. 13, 2019.
"LTE; Evolved Universal Terrestrial Radio Access (E-UTRA); Medium Access Control (MAC) protocol specification (3GPP TS 36.321 version 14.2.1 Release 14)," XP014292437, total 108 pages, European Telecommunications Standards Institute, Sophia Antipolis Cedex—France (May 2017).

* cited by examiner

P: padding bit

METHOD FOR SENDING BUFFER STATUS REPORT AND USER EQUIPMENT

CROSS-REFERENCE TO RELATED APPLICATIONS

This application is a continuation of International Application No. PCT/CN2018/090133, filed on Jun. 6, 2018, which claims priority to Chinese Patent Application No. 201710459268.5, filed on Jun. 16, 2017, both of which are hereby incorporated by reference in their entireties.

TECHNICAL FIELD

This application relates to the field of communications technologies, and in particular, to a method for sending a buffer status report and a user equipment.

BACKGROUND

In Long Term Evolution (LTE) communication, when a user equipment (UE) requests an uplink resource from a network-side device by using an uplink scheduling request (SR), the uplink scheduling request indicates only whether the UE needs to send uplink data, and does not indicate a volume of uplink data that the UE needs to send. The UE needs to send a buffer status report (BSR) to the network-side device, to notify the network-side device of the volume of data that is in an uplink buffer of the UE and that needs to be sent, thereby helping the network-side device determine a quantity of uplink resources to be allocated to the UE.

The UE may establish a large quantity of radio bearers based on different services. Each radio bearer corresponds to a logical channel (LC). If the UE reports one BSR on each logical channel, this brings a large quantity of signaling overheads. To avoid the overheads, a concept of a logical channel group (LCG) is introduced into LTE communication. Each logical channel belongs to one of four LCGs of the UE. The UE reports the BSR based on the LCG instead of reporting the BSR on each logical channel.

In LTE communication, BSRs have two formats:

(1) A short BSR or a truncated BSR is used to report an uplink buffer amount of one LCG The BSR occupies 1 byte and includes an LCG identity (ID) occupying 2 bits and an LCG buffer index (also referred to as a buffer size) occupying 6 bits. The buffer index indicates the uplink buffer amount of the LCG (2) A long BSR is used to report uplink buffer amounts of all four of the LCGs. The long BSR does not need to include LCG IDs, and 6-bit buffer indexes are respectively coded for an LCG ID 0 to an LCG ID 3. A first buffer index indicates an uplink buffer amount of the LCG ID 0, a second buffer index indicates an uplink buffer amount of the LCG ID 1, and so on.

As a service volume of the UE increases, the UE may establish more radio bearers, and the UE may use more LCs. Therefore, more LCGs are needed. However, the BSR in the prior art is applicable only to buffer reporting when four LCGs are configured for the UE, and cannot meet a buffer reporting requirement when more LCGs are configured for the UE.

SUMMARY

This application provides a method for sending a buffer status report and a user equipment, to resolve a prior-art problem that a BSR cannot meet a buffer reporting requirement when more than four LCGs are configured for UE.

According to a first aspect, this application provides a method for sending a buffer status report (BSR), including: generating, by a user equipment (UE), the BSR, where eight LCGs are configured for the UE, the BSR includes a buffer index of at least one of the eight LCGs, the buffer index of the LCG indicates an uplink buffer amount of the LCG the uplink buffer amount of the LCG is a sum of uplink buffer amounts of all LCs included in the LCG the BSR occupies X bytes, a buffer index of one LCG occupies N bits, X is an integer ranging from 1 to 17, N is an integer ranging from 5 to 16, and a case in which X is 1 and N is 6 at the same time does not exist; and sending, by the UE, the generated BSR to a network-side device.

In the foregoing technical solution, the BSR may include a buffer index of one of the eight LCGs configured for the UE, and the BSR is reported to the network-side device to enable the network-side device to allocate, to the UE, an uplink resource for sending an uplink buffer of the LCG Alternatively, the BSR may include buffer indexes of a plurality of LCGs in the eight LCGs configured for the UE, and the BSR is reported to the network-side device to enable the network-side device to allocate, to the UE, an uplink resource for sending an uplink buffer of each of the plurality of LCGs. Alternatively, the BSR may include a buffer index of each of the eight LCGs configured for the UE, and the BSR is reported to the network-side device to enable the network-side device to allocate, to the UE, an uplink resource for sending an uplink buffer of each of the eight LCGs. According to the foregoing technical solution, a prior-art problem that a BSR cannot meet a buffer reporting requirement when more than four LCGs are configured for UE is resolved.

In an optional design, with reference to the first aspect, in a first possible implementation of the first aspect, the BSR indicates an uplink buffer amount of one LCG the BSR further includes an LCG identity ID, the LCG ID occupies 3 bits, X is 1 or 2, and N is an integer ranging from 5 to 13.

In an optional design, with reference to the first possible implementation of the first aspect, in a second possible implementation of the first aspect, X is equal to 1, and N is equal to 5. In this implementation, the BSR occupies only 1 byte, so that an uplink resource used to transmit the BSR can be saved and a transmission time can be reduced.

Optionally, with reference to the first possible implementation of the first aspect, in a third possible implementation of the first aspect, X is equal to 2, and N is an integer ranging from 6 to 13. In this implementation, the LCG ID is configured as 3 bits to ensure that the LCG ID can be used to distinguish between the eight LCGs configured for the UE. The buffer index of the LCG is configured as not less than 6 bits, so that each buffer index indicates a relatively small uplink buffer range, improving accuracy of uplink resources allocated by the network-side device to the UE.

Optionally, with reference to the third possible implementation of the first aspect, in a fourth possible implementation of the first aspect, when N is less than 13, (13–N) bits in the BSR except the LCG ID and the buffer index are configured as reserved bits or padding bits. Information carried by the reserved bits may be configured based on an actual requirement, to enhance scalability of the BSR.

Optionally, with reference to the first aspect, in a fifth possible implementation of the first aspect, the BSR indicates uplink buffer amounts of the eight LCGs, the BSR includes a buffer index of each of the eight LCGs, N is an integer ranging from 5 to 13, and X is equal to N. In this implementation, the BSR may carry the buffer indexes of the eight LCGs, and the uplink buffer amounts of all the LCGs of the UE are reported by using one BSR. Therefore, the network-side device can allocate uplink resources for all to-be-sent uplink data of the UE based on the BSR, and this is quite efficient.

Optionally, with reference to the first aspect, in a sixth possible implementation of the first aspect, 8 bits of a first byte of the BSR are in a one-to-one correspondence with the eight LCGs, each bit of the first byte indicates whether a corresponding LCG has an uplink buffer, the BSR includes a buffer index of each of K LCGs that have an uplink buffer in the eight LCGs, and K is a positive integer.

In this implementation, the BSR uses the first byte to indicate all LCGs that have an uplink buffer in the eight LCGs, and the BSR carries buffer indexes of all the LCGs that have an uplink buffer. The network-side device may determine, based on the BSR, the LCGs that have an uplink buffer and an uplink buffer amount of each of the LCGs that have an uplink buffer, and further allocate a corresponding uplink resource to the UE. The BSR may carry buffer indexes of a plurality of LCGs, but does not carry buffer indexes of LCGs that have no uplink buffer. Therefore, a case in which the BSR carries unnecessary information (a buffer index of an LCG that has no uplink buffer) and becomes excessively long is avoided. In addition, completeness of a reported uplink buffer amount of an LCG and BSR transmission efficiency are both ensured.

Optionally, with reference to the sixth possible implementation of the first aspect, in a seventh possible implementation of the first aspect, the K buffer indexes corresponding to the K LCGs are configured from a second byte of the BSR, and a sequence of the K buffer indexes is consistent with a sequence of bits in the first byte that correspond to the K LCGs. In this implementation, a 3-bit LCG ID does not need to be configured for each buffer index, so that a length of the BSR can be shortened, a bandwidth for transmitting the BSR can be reduced, and a transmission time of the BSR can be reduced.

Optionally, with reference to the sixth or the seventh possible implementation of the first aspect, in an eighth possible implementation of the first aspect, a padding bit is further configured after the K buffer indexes in the BSR.

Optionally, with reference to any one of the first aspect, the first and the second possible implementations of the first aspect, and the fifth to the eighth possible implementations of the first aspect, in a ninth possible implementation of the first aspect, when N is equal to 5, the uplink buffer amount indicated by the buffer index of the LCG meets $S_i = S_{2i}^{LTE} \cup S_{2i+1}^{LTE}$, where i is a value of the buffer index, i is an integer ranging from 0 to 31, $S_i$ indicates an uplink buffer amount indicated when a value of the buffer index is i, $S_j^{LTE}$ indicates an uplink buffer amount indicated when a value of a buffer index defined in the Long Term Evolution LTE protocol is j, j is an integer ranging from 0 to 63, and ∪ is a union set operator. In this implementation, an uplink buffer amount indicated by a buffer index in this application is set based on an uplink buffer amount indicated by a buffer index in the existing LTE protocol, to improve compatibility of the solution in this application.

According to a second aspect, this application provides a user equipment, and the user equipment is configured to perform the method according to the first aspect or any possible implementation of the first aspect. Specifically, the user equipment includes a module configured to perform the method in the first aspect or any possible implementation of the first aspect.

In a first possible implementation of the second aspect, the user equipment includes a generating module and a sending module. The generating module is configured to generate a BSR, where eight logical channel groups (LCGs) are configured for the UE, the BSR includes a buffer index of at least one of the eight LCGs, the buffer index of the LCG indicates an uplink buffer amount of the LCG the BSR occupies X bytes, a buffer index of one LCG occupies N bits, X is an integer ranging from 1 to 17, N is an integer ranging from 5 to 16, and a case in which X is 1 and N is 6 at the same time does not exist. The sending module is configured to send the BSR to a network-side device.

According to a third aspect, this application provides a user equipment, and the user equipment is configured to perform the method according to the first aspect or any possible implementation of the first aspect. Specifically, the user equipment includes a processor, a memory, and a transceiver. The processor may communicate with the memory and the transceiver by using a bus. The memory stores a computer instruction. When the processor executes the computer instruction, the processor generates a BSR that is generated according to the method in the first aspect or any possible implementation of the first aspect. The transceiver is configured to send, to a network-side device, the BSR generated by the processor.

According to a fourth aspect, this application further provides a computer readable storage medium. The readable storage medium stores a computer instruction. When the instruction runs on a computer, the computer performs the method in the first aspect or any possible implementation of the first aspect.

According to a fifth aspect, this application provides a computer program product. When the computer program product runs on a computer, the computer performs the method in the first aspect or any possible implementation of the first aspect.

In this application, based on the implementations provided in the foregoing aspects, the implementations may be further combined to provide more implementations.

DESCRIPTION OF EMBODIMENTS

To make objectives, technical solutions, and advantages of this application clearer, the following further describes this application in detail with reference to the accompanying drawings.

This application provides a method for sending a buffer status report and a user equipment, to resolve a prior-art problem that a BSR cannot meet a buffer reporting requirement when more than four LCGs are configured for UE. The method and the apparatus are based on a same inventive concept. Because a problem-resolving principle of the method is similar to that of the apparatus, mutual reference may be made between apparatus implementation and method implementation without repeated description.

"A plurality of" mentioned in this application means "two or more". In addition, in the description of this application, words such as "first" and "second" are merely used for distinction and description, and shall not be understood as an indication or implication of relative importance or an indication or implication of an order.

Embodiments of this application may be applied to a 5th generation mobile communications (5G) system, for example, a radio access (New Radio, NR) network of 5G; or may be applied to another wireless communications system, for example, a Long Term Evolution (LTE) system or a new network device system.

The user equipment (UE) mentioned in embodiments of this application may be a device that provides a user with voice and/or data connectivity, a handheld device with a radio connection function, or another processing device connected to a radio modem. Wireless user equipment may communicate with one or more core networks through a radio access network (RAN). The wireless user equipment may be a mobile terminal such as a mobile phone (also referred to as a "cellular" phone) or a computer with a mobile terminal. For example, the wireless user equipment may be a portable, pocket-sized, handheld, computer built-in, or in-vehicle mobile apparatus that exchanges voice and/or data with the radio access network. For example, the wireless user equipment may be a device such as a personal communications service (PCS) phone, a cordless telephone set, a Session Initiation Protocol (SIP) phone, a wireless local loop (WLL) station, or a personal digital assistant (PDA). The wireless user equipment may also be referred to as a system, a subscriber unit, a subscriber station, a mobile station, a mobile, a remote station, an access point, a remote terminal, an access terminal, a user terminal, a user agent, or a user device.

For a network-side device mentioned in embodiments of the present application, the network-side device may be a base station. The base station may be configured to perform conversion between a received over-the-air frame and an Internet Protocol (IP) packet, and serve as a router between the wireless terminal device and a remaining part of an access network. The remaining part of the access network may include an IP network-side device. The base station may further coordinate attribute management of an air interface. For example, the base station may be a next-generation NodeB (gNB) in an NR network, or may be an evolved NodeB (evolutional NodeB, eNB or e-NodeB) in LTE. The foregoing description is not intended to be limiting with respect to the scope of this application.

Figure 1:
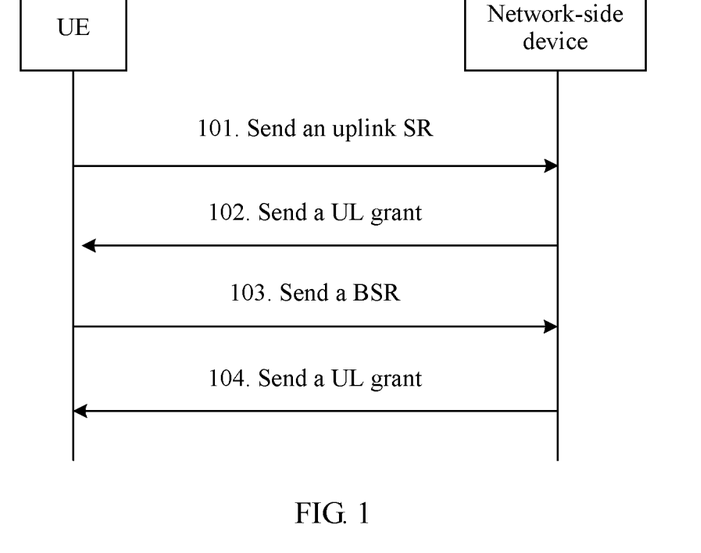
FIG. 1 is a schematic flowchart of sending a BSR by a UE.

The following first describes a procedure in which the UE sends a BSR to the network-side device. Referring to FIG. 1, the procedure includes the following steps:

Step 101: The UE sends an uplink scheduling request (SR) to the network-side device, where the uplink SR is used to notify the network-side device whether the UE has uplink data to be transmitted.

Step 102: The network-side device sends an uplink scheduling grant (Up Link grant, UL grant) to the UE to allocate an uplink resource to the UE, where a quantity of uplink resources depends on a specific implementation of the network-side device, and the network-side device usually allocates, to the UE, uplink resources sufficient for sending the BSR.

Step 103: The UE sends the BSR to the network-side device.

Step 104: The network-side device determines, based on the BSR sent by the UE, a quantity of uplink resources to be allocated to the UE, and sends a corresponding UL grant to the UE.

The foregoing procedure is described to facilitate understanding of a solution provided in embodiments of this application. It should be noted that, in an actual application of a solution provided in embodiments of this application, a procedure in which the UE sends a BSR to the network-side device may be different from the foregoing procedure.

Figure 2A:
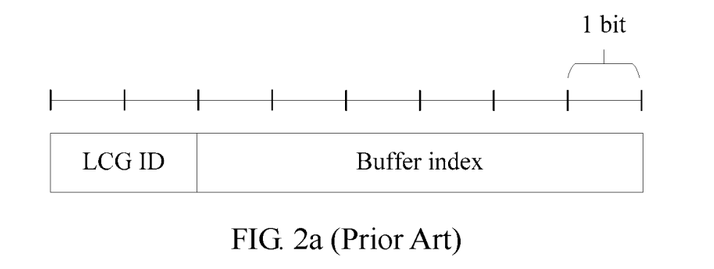
FIG. 2a is a schematic diagram of a short BSR or a truncated BSR in the prior art.

FIG. 2a is a schematic diagram of a short BSR or a truncated BSR defined in LTE in the prior art. For a short BSR and a truncated BSR, an LCG ID occupies 2 bits. A value of the LCG ID ranges from 0 to 3. Each value of the LCG ID corresponds to one of four LCGs configured for a UE. An LCG ID of a BSR shown in FIG. 2a can be used to distinguish between only four LCGs. Therefore, the short BSR or the truncated BSR cannot continue to be used when more than four LCGs are configured for the UE.

Figure 2B:
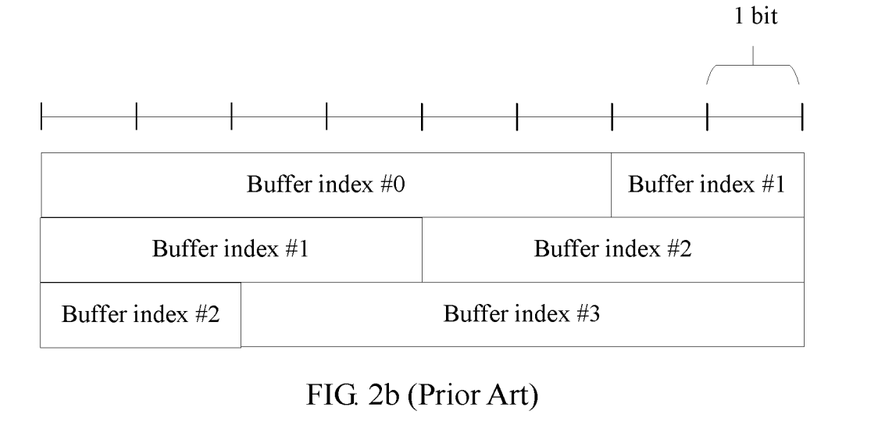
FIG. 2b is a schematic diagram of a long BSR in the prior art.

FIG. 2b is a schematic diagram of a long BSR defined in LTE in the prior art. Buffer indexes (a buffer index #0 to a buffer index #3) of four LCGs are sequentially encoded in the long BSR. Each buffer index occupies 6 bytes. Likewise, the long BSR cannot continue to be used when more than four LCGs are configured for UE.

Figure 3:
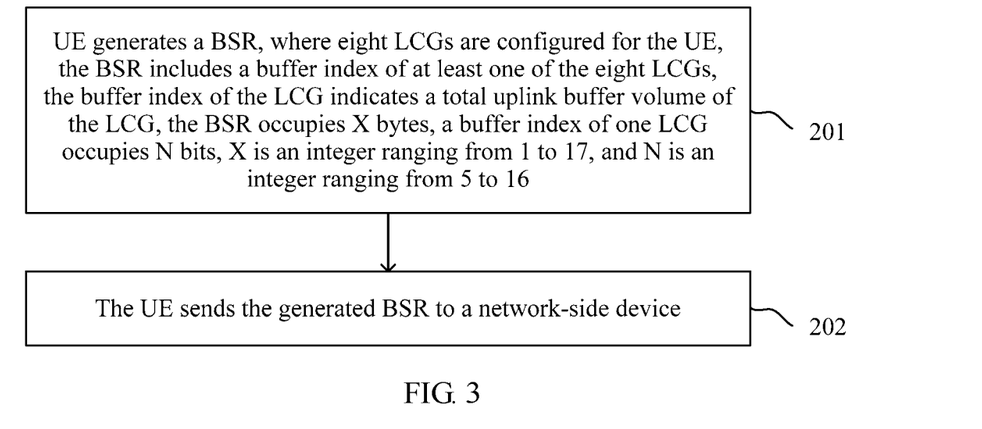
FIG. 3 is a schematic flowchart of generating a BSR by a UE according to an embodiment of this application.

The following describes a method for sending a BSR that is provided in embodiments of this application. Referring to FIG. 3, the method includes the following steps:

Step 201: A UE generates a BSR, where eight LCGs are configured for the UE, the BSR includes a buffer index of at least one of the eight LCGs, the buffer index of the LCG indicates an uplink buffer amount of the LCG and the uplink buffer amount of the LCG is a sum of uplink buffer amounts of all LCs included in the LCG The BSR occupies X bytes. A buffer index of one LCG occupies N bits. X is an integer ranging from 1 to 17, and N is an integer ranging from 5 to 16. A case in which X is 1 and N is 6 at the same time does not exist.

Specifically, each radio bearer established by the UE corresponds to one LC, each LC belongs to one of the eight LCGs, and each LCG may include one or more LCs. For an LC, which LCG the LC belongs to is configured when the LC is established, for example, is set based on a logical channel group field of an information element: logical channel configuration (Information Element: Logical Channel Config).

Step 202: The UE sends the generated BSR to a network-side device. The BSR may be used as a part of a Media Access Control (MAC) layer protocol data unit (PDU). The BSR is transmitted to the network-side device by using the MAC layer PDU sent by the UE.

In the foregoing technical solution, the BSR may include a buffer index of one of the eight LCGs configured for the UE, and the BSR is reported to the network-side device to enable the network-side device to allocate, to the UE, an uplink resource for sending an uplink buffer of the LCG Alternatively, the BSR may include buffer indexes of a plurality of LCGs in the eight LCGs configured for the UE, and the BSR is reported to the network-side device to enable the network-side device to allocate, to the UE, an uplink resource for sending an uplink buffer of each of the plurality of LCGs. Alternatively, the BSR may include a buffer index of each of the eight LCGs configured for the UE, and the BSR is reported to the network-side device to enable the network-side device to allocate, to the UE, an uplink resource for sending an uplink buffer of each of the eight LCGs. According to the foregoing technical solution, a prior-art problem that a BSR cannot meet a buffer reporting requirement when more than four LCGs are configured for UE is resolved.

In this embodiment of this application, the BSR may have a plurality of implementations that are respectively described in the following:

1. Type-1 BSR

Like the short BSR or the truncated BSR defined in FIG. 2a, the type-1 BSR is used to report an uplink buffer amount of one of eight LCGs configured for UE. In the type-1 BSR, an LCG ID occupies 3 bits, and a value of the LCG ID ranges from 0 to 7. Each value corresponds to one of the eight LCGs. For example, an LCG ID 0 represents a first LCG of the eight LCGs, an LCG ID 1 represents a second LCG of the eight LCGs, and so on.

Figure 4A:
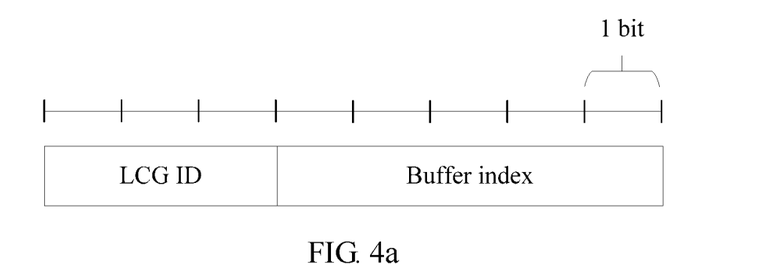
FIG. 4a to FIG. 4d are schematic diagrams of a type-1 BSR according to an embodiment of this application.

FIG. 4a shows a possible implementation of the type-1 BSR. The BSR occupies 1 byte. An LCG ID occupies first 3 bits, and a buffer index of the LCG occupies following 5 bits. In some embodiments, the LCG ID may alternatively occupy last 3 bits, and the buffer index of the LCG occupies first 5 bits. In this implementation, the BSR occupies only 1 byte, so that an uplink resource used to transmit the BSR can be saved and a transmission time can be reduced.

Figure 4B:
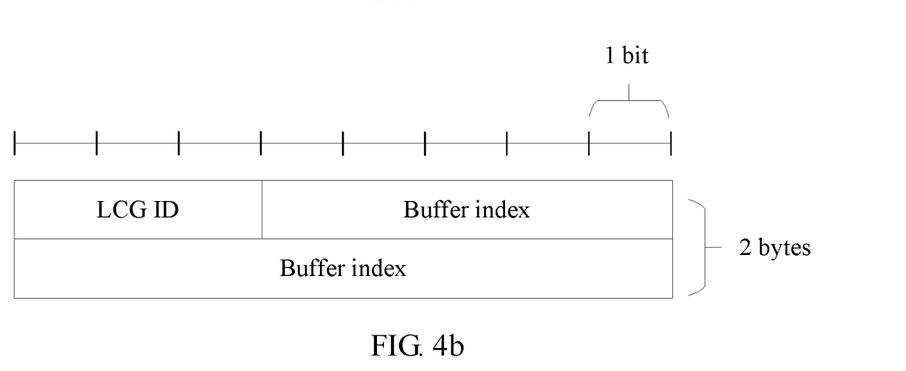

FIG. 4b shows another possible implementation of the type-1 BSR. The BSR occupies 2 bytes. An LCG ID occupies 3 bits. The LCG ID may be located at first 3 bits of a first byte of the BSR. In some embodiments, the LCG ID may be alternatively located at another location. For example, a first bit of the first byte is a reserved bit, and the LCG ID occupies a second bit to a fourth bit of the first byte. For another example, the LCG ID occupies last 3 bits of a second byte, and so on. A buffer index of an LCG in the BSR occupies N bits, and N ranges from 6 to 13.

A buffer index of an LCG indicates an uplink buffer amount of the LCG The uplink buffer amount may be a buffer range. Table 1 is a schematic diagram of a table of mapping between a buffer index and a buffer range. In the table, a and b are both positive numbers, and a is less than b.

TABLE 1

| Value of a buffer index | buffer range |
| --- | --- |
| 0 | 0 |
| 1 | (0, a] |
| 2 | (a, b] |
| ... | ... |

After receiving the BSR, a network-side device obtains the buffer index from the BSR, determines a buffer range of the LCG of the UE based on the mapping table shown in Table 1, and allocates an uplink resource to the UE based on the buffer range. It may be learned that if a value range of the buffer index is larger, a buffer range corresponding to each buffer index is smaller, and the network-side device can more accurately estimate an actual uplink buffer size of the LCG of the UE and further more accurately allocate an uplink resource to the UE, avoiding uplink resource waste. In the technical solutions shown in FIG. 4b to FIG. 4d, the LCG ID is configured as 3 bits to ensure that the LCG ID can be used to distinguish between the eight LCGs configured for the UE. The buffer index of the LCG is configured as not less than 6 bits, so that each buffer index indicates a relatively small uplink buffer range, improving accuracy of uplink resources allocated by the network-side device to the UE.

Figure 4C:
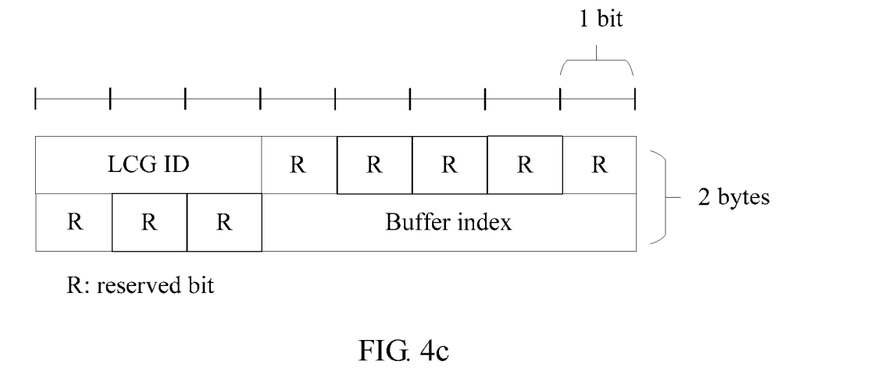
Figure 4D:
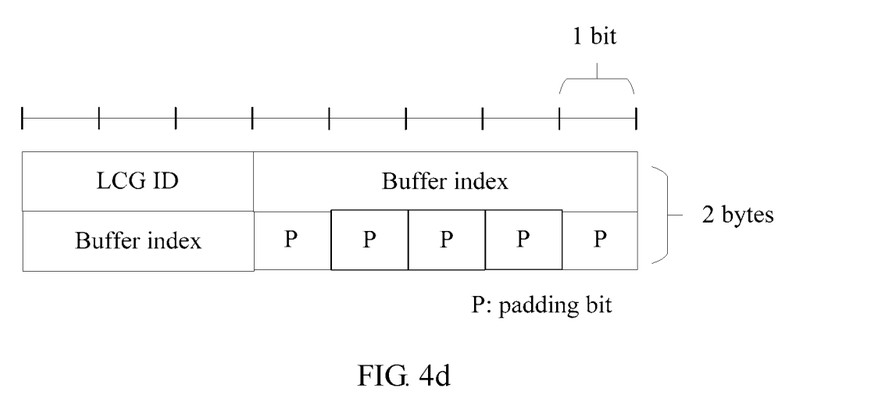

In the BSR shown in FIG. 4b, N=13, and the BSR consists of two parts: the LCG ID and the buffer index of the LCG In BSRs shown in FIG. 4c and FIG. 4d, N is less than 13, and bits in the BSR except bits occupied by an LCG ID and a buffer index of the LCG may be configured as reserved bits or padding bits. The reserved bits or the padding bits may be located at an end of the BSR, or may be located between the LCG ID and the buffer index. Information carried by the reserved bits may be configured based on an actual requirement, to enhance scalability of the BSR.

2. Type-2 BSR

Figure 5A:
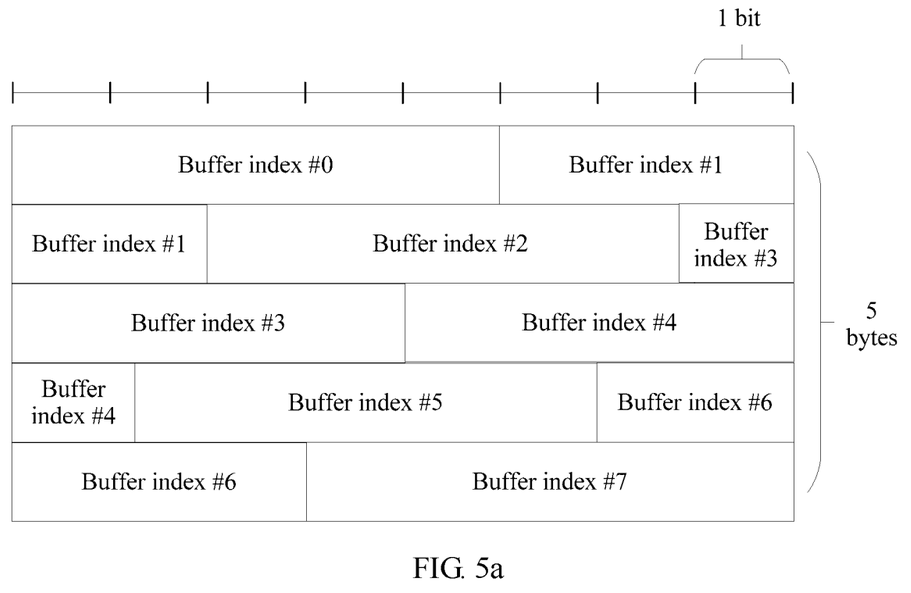
FIG. 5a and FIG. 5b are schematic diagrams of a type-2 BSR according to an embodiment of this application.
Figure 5B:
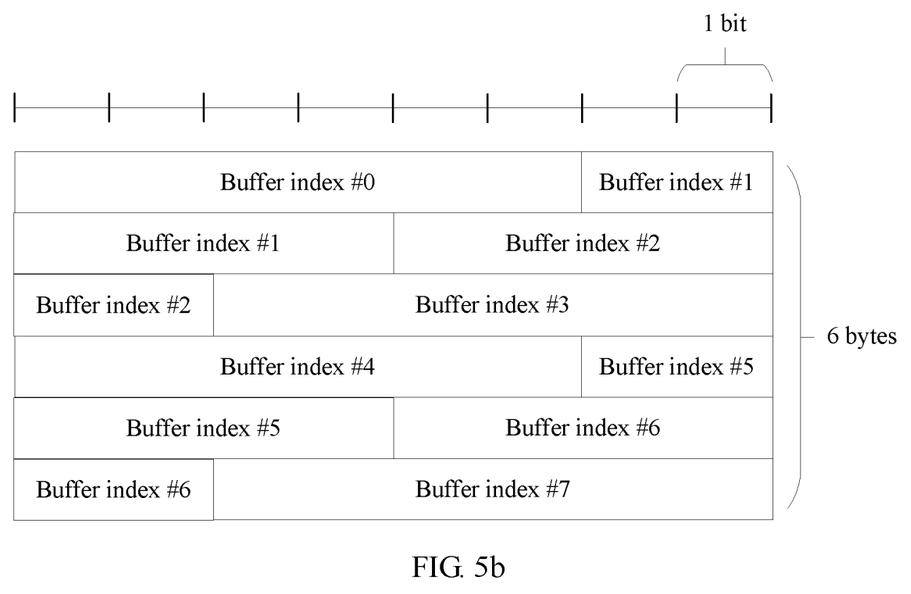

The type-2 BSR is used to report uplink buffer amounts of eight LCGs configured for UE. Specifically, because the eight LCGs in total are configured for the UE and the type-2 BSR carries the uplink buffer amounts of all the LCGs, the type-2 BSR may not include an LCG ID, and buffer indexes may be respectively coded for the eight LCGs. Each buffer index occupies N bits, and N is an integer ranging from 5 to 13. A quantity X of all bytes occupied by the type-2 BSR is equal to N.

For example, referring to FIG. 5a, FIG. 5a is a schematic diagram of a type-2 BSR when N is 5. Buffer indexes are respectively coded in the BSR for an LCG ID 0 to an LCG ID 7. For another example, referring to FIG. 5b, FIG. 5b is a schematic diagram of a type-2 BSR when N is 6. In FIG. 5a and FIG. 5b, a buffer index #S indicates a buffer index of an LCG ID S, and S ranges from 0 to 7.

In the foregoing technical solutions, the BSR may carry the buffer indexes of the eight LCGs, and the uplink buffer amounts of all the LCGs of the UE are reported by using one BSR. Therefore, a network-side device can allocate uplink resources for all to-be-sent uplink data of the UE based on the BSR, and this is quite efficient.

3. Type-3 BSR

Figure 6A:
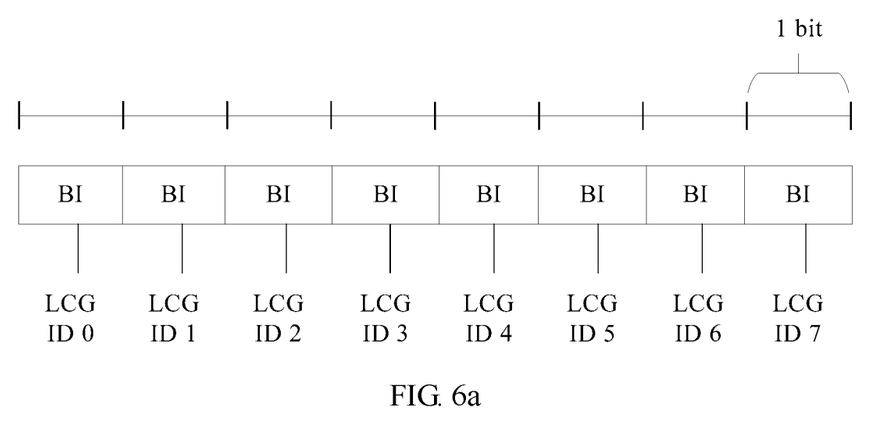
FIG. 6a is a schematic diagram of a first byte of a type-3 BSR according to an embodiment of this application.

The type-3 BSR is used to report an uplink buffer amount of one or more of eight LCGs configured for a UE. Referring to FIG. 6a, 8 bits of a first byte of the BSR are in a one-to-one correspondence with the eight LCGs, and each bit of the first byte indicates whether a corresponding LCG has an uplink buffer. For example, when a value of a bit is 0, it indicates that an LCG corresponding to the bit has no uplink buffer; on the contrary, when a value of a bit is 1, it indicates that an LCG corresponding to the bit has an uplink buffer. In this embodiment of this application, the first byte of the type-3 BSR may also be referred to as a buffer indicator (BI) byte, and each bit of the first byte may be referred to as a BI bit. The type-3 BSR carries only buffer indexes of K LCGs that have an uplink buffer, and K is a positive integer.

Figure 6B:
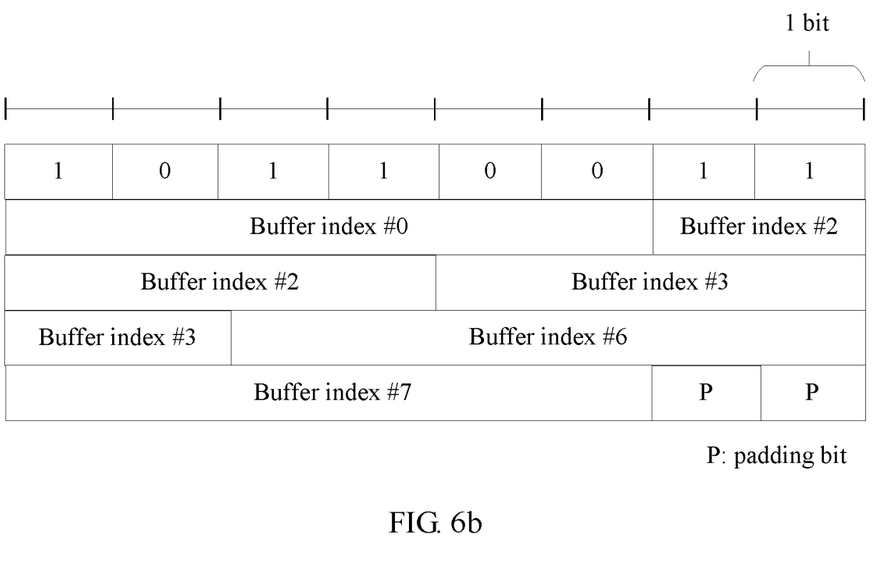
FIG. 6b is a schematic diagram of a type-3 BSR according to an embodiment of this application.

Referring to FIG. 6b, values of the first, third, fourth, seventh, and eighth bits in a first byte of the BSR are 1. The BSR carries five buffer indexes: respectively buffer indexes of an LCG ID 0, an LCG ID 2, an LCG ID 3, an LCG ID 6, and an LCG ID 7.

In FIG. 6b, each buffer index occupies 6 bits. Alternatively, each buffer index may occupy any length of 5 to 16 bits provided that lengths of all buffer indexes in one BSR are consistent.

In the foregoing technical solution, the BSR uses the first byte to indicate all LCGs that have an uplink buffer in the eight LCGs, and the BSR carries buffer indexes of all the LCGs that have an uplink buffer. A network-side device may determine, based on the BSR, the LCGs that have an uplink buffer and an uplink buffer amount of each of the LCGs that have an uplink buffer, and further allocate a corresponding uplink resource to the UE. The BSR may carry buffer indexes of a plurality of LCGs, but does not carry buffer indexes of LCGs that have no uplink buffer. Therefore, a case in which the BSR carries unnecessary information (a buffer index of an LCG that has no uplink buffer) and becomes excessively long is avoided. In addition, completeness of a reported uplink buffer amount of an LCG and BSR transmission efficiency are both ensured.

Referring to FIG. 6b, the K buffer indexes corresponding to the K LCGs may be configured from a second byte of the type-3 BSR, and a sequence of the K buffer indexes is consistent with a sequence of bits in the first byte that correspond to the K LCGs. For example, the buffer index corresponding to the LCG ID 0 is first coded, then the buffer index corresponding to the LCG ID 2 is coded, and so on. After receiving the BSR, the network-side device determines a first buffer index from the second byte based on a length of a buffer index: N bits, and determines that the first buffer index is a buffer index of an LCG corresponding to a first bit whose value is 1 in the first byte of the BSR; then, determines a second buffer index after the first buffer index, and determines that the second buffer index is a buffer index of an LCG corresponding to a second bit whose value is 1 in the first byte of the BSR; and so on. In the foregoing technical solution, a 3-bit LCG ID does not need to be configured for each buffer index, so that a length of the BSR can be shortened, a bandwidth for transmitting the BSR can be reduced, and a transmission time of the BSR can be reduced.

Referring to FIG. 6b, when a last buffer index carried in the type-3 BSR does not fully occupy the whole byte, following bits may be configured as padding bits or reserved bits. When these bits are configured as padding bits, these bits may be all configured as 0 or 1.

Optionally, in all the foregoing possible solutions, when the quantity N of bits occupied by a buffer index is equal to 6, a value range of the buffer index is 0 to 63. Each value corresponds to an uplink buffer amount. The uplink buffer amount may be a buffer range. A correspondence between a buffer index and an uplink buffer range that is defined in the existing LTE protocol may continue to be used for the buffer range, to enhance compatibility of the solutions in embodiments of this application.

Optionally, in this embodiment of this application, when a buffer index of an LCG occupies 5 bits, a value range of the buffer index is 0 to 31. Each value corresponds to one uplink buffer amount. The uplink buffer amount may be a buffer range. The buffer range may be indicated by: $S_i = S_{2i}^{LTE} \cup S_{2i+1}^{LTE}$, where i is a value of the buffer index, i is an integer ranging from 0 to 31, $S_i$ indicates a buffer amount indicated when a value of the buffer index is i, $S_j^{LTE}$ indicates an uplink buffer amount indicated when a value of a buffer index defined in the LTE protocol is j, j is an integer ranging from 0 to 63, and a symbol "$\cup$" is a union set operator. For example, $S_0 = S_0^{LTE} \cup S_1^{LTE}$ indicates that, when N=5, if the value of the buffer index of the LCG is 0, the buffer range of the LCG is a union set of a buffer range obtained when the value of the buffer index is 0 in the LTE and a buffer range obtained when the value of the buffer index is 1 in the LTE.

It should be noted that the foregoing three types of BSRs may be separately implemented. To be specific, when the UE reports the uplink buffer amount to the network-side device, the UE sends only a type-1 BSR, only a type-2 BSR, or only a type-3 BSR. In some embodiments, any two of the foregoing three types of BSRs may be combined for implementation. For example, when only one LCG has an uplink buffer, the UE sends a type-1 BSR; when more than one LCG has an uplink buffer, the UE sends a type-2 BSR. For another example, when only one LCG has an uplink buffer, the UE sends a type-1 BSR; when more than one LCG has an uplink buffer, the UE sends a type-3 BSR. For another example, when all the LCGs have an uplink buffer, the UE sends a type-2 BSR; otherwise, the UE sends a type-3 BSR. In another embodiment, the foregoing three types of BSRs may be combined for implementation. For example, when only one LCG has an uplink buffer, the UE sends a type-1 BSR; when all the LCGs have an uplink buffer, the UE sends a type-2 BSR; in a case other than the foregoing two cases, the UE sends a type-3 BSR. Optionally, when two or three of the three types of BSRs are combined for implementation, quantities of bits occupied by one buffer index are consistent in different types of BSRs.

In addition, when more than eight LCGs are configured for the UE, embodiments of this application can still be applied. For example, when there are 16 LCGs, it is configured in a type-1 BSR that an LCG ID occupies 4 bits. Each bit in first two bytes of a type-3 BSR corresponds to one LCG of the UE. The bit indicates whether the corresponding LCG has an uplink buffer. The BSR carries only a buffer index of the LCG that has an uplink buffer.

Figure 7:
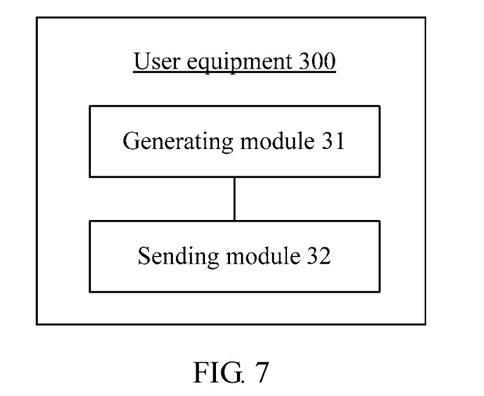
FIG. 7 is a schematic diagram of a user equipment 300 according to an embodiment of this application.

FIG. 7 is a schematic diagram of a user equipment 300 according to an embodiment of this application. The user equipment 300 includes a generating module 31 and a sending module 32.

The generating module 31 is configured to generate a BSR, where eight logical channel groups (LCGs) are configured for the UE, the BSR includes a buffer index of at least one of the eight LCGs, the buffer index of the LCG indicates an uplink buffer amount of the LCG; the BSR occupies X bytes, a buffer index of one LCG occupies N bits, X is an integer ranging from 1 to 17, N is an integer ranging from 5 to 16, and a case in which X is 1 and N is 6 at the same time does not exist.

The sending module 32 is configured to send the BSR to a network-side device.

Module division in this embodiment of this application is an example and is merely logical function division, and there may be other divisions during actual implementation. In addition, functional modules in this embodiment of this application may be integrated into one processor or may exist alone physically, or two or more modules are integrated into one module. The foregoing integrated module may be implemented in a form of hardware, or may be implemented in a form of a software function module. The software function modules are configured to perform the steps in a method for sending a BSR in accordance with FIG. 3 to FIG. 6b.

Figure 8:
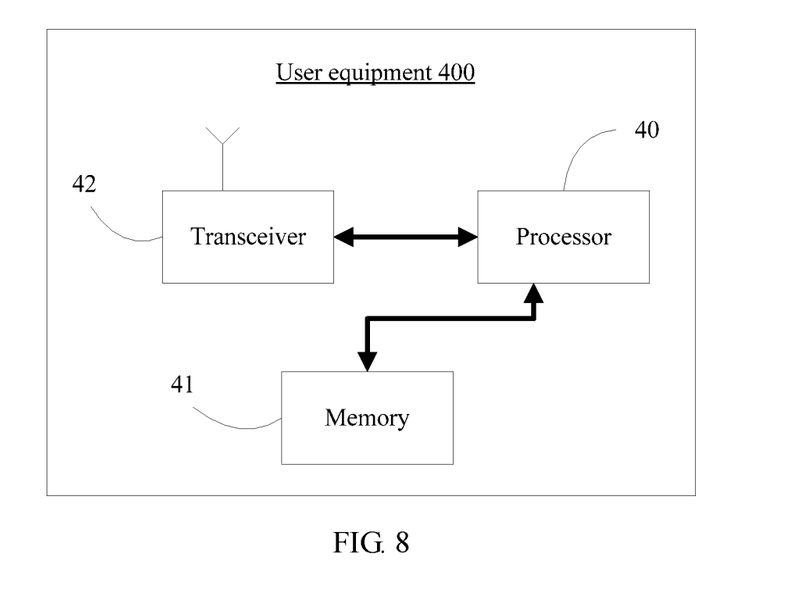
FIG. 8 is a schematic diagram of a user equipment 400 according to an embodiment of this application.

FIG. 8 is a schematic diagram of a user equipment 400 according to an embodiment of this application. The user equipment 400 includes a memory 41, a transceiver 42, and a processor 43. The processor 43 may communicate with the memory 41 and the transceiver 42 by using a bus.

The memory 41 stores a computer instruction. When the processor 43 executes the computer instruction, the processor 43 generates a BSR, where eight logical channel groups (LCGs) are configured for the UE, the BSR includes a buffer index of at least one of the eight LCGs, the buffer index of the LCG indicates an uplink buffer amount of the LCG the BSR occupies X bytes, a buffer index of one LCG occupies N bits, X is an integer ranging from 1 to 17, N is an integer ranging from 5 to 16, and a case in which X is 1 and N is 6 at the same time does not exist.

The transceiver 42 is configured to send, to a network-side device, the BSR generated by the processor 43.

It should be noted that the processor 43 may be one processing element or a general term for a plurality of processing elements. For example, the processor 43 may be a central processing unit (CPU), or an application-specific integrated circuit (ASIC), or one or more integrated circuits configured to implement this embodiment of the present application, for example, one or more microprocessors (Digital Signal Processor, DSP) or one or more field programmable gate arrays (FPGA). The memory 41 may be one storage element or a general term for a plurality of storage elements, and is configured to store executable program code, or parameter, data, and the like for running a residential access network device or terminal. In addition, the memory 41 may include a random access memory (RAM), or may include a non-volatile memory (NVM) such as a disk memory or a flash memory (Flash). The transceiver 42 may include a discrete transceiver and receiver, or may be integration of a transceiver and a receiver.

Optionally, in a first possible implementation of the user equipment 300 or the user equipment 400, the BSR indicates an uplink buffer amount of one of the eight LCGs, the BSR further includes an LCG identity ID, the LCG ID occupies 3 bits, X is 1 or 2, and N is an integer ranging from 5 to 13.

Optionally, with reference to the first possible implementation of the user equipment 300 or the user equipment 400, in a second possible implementation of the user equipment 300 or the user equipment 400, X is equal to 1, and N is equal to 5.

Optionally, with reference to the first possible implementation of the user equipment 300 or the user equipment 400, in a third possible implementation of the user equipment 300 or the user equipment 400, X is equal to 2, and N is an integer ranging from 6 to 13.

Optionally, with reference to the third possible implementation of the user equipment 300 or the user equipment 400, in a fourth possible implementation of the user equipment 300 or the user equipment 400, when N is less than 13, (13−N) bits in the BSR except the LCG ID and the buffer index are configured as reserved bits or padding bits.

Optionally, in a fifth possible implementation of the user equipment 300 or the user equipment 400, the BSR indicates uplink buffer amounts of the eight LCGs, the BSR includes a buffer index of each of the eight LCGs, N is an integer ranging from 5 to 13, and X is equal to N.

Optionally, in a sixth possible implementation of the user equipment 300 or the user equipment 400, 8 bits of a first byte of the BSR are in a one-to-one correspondence with the eight LCGs, each bit of the first byte indicates whether a corresponding LCG has an uplink buffer, the BSR includes a buffer index of each of K LCGs that have an uplink buffer in the eight LCGs, and K is a positive integer.

Optionally, with reference to the sixth possible implementation of the user equipment 300 or the user equipment 400, in a seventh possible implementation of the user equipment 300 or the user equipment 400, the K buffer indexes corresponding to the K LCGs are configured from a second byte of the BSR, and a sequence of the K buffer indexes is consistent with a sequence of bits in the first byte that correspond to the K LCGs.

Optionally, with reference to the sixth or the seventh possible implementation of the user equipment 300 or the user equipment 400, in an eighth possible implementation of the user equipment 300 or the user equipment 400, a padding bit is further configured after the K buffer indexes in the BSR.

Optionally, in all the possible implementations of the user equipment 300 or the user equipment 400, when N is equal to 5, the uplink buffer amount indicated by the buffer index of the LCG meets $S_i = S_{2i}^{LTE} \cup S_{2i+1}^{LTE}$, where i is a value of the buffer index, i is an integer ranging from 0 to 31, $S_i$ indicates an uplink buffer amount indicated when a value of the buffer index is i, $S_j^{LTE}$ indicates an uplink buffer amount indicated when a value of a buffer index defined in the Long Term Evolution LTE protocol is j, j is an integer ranging from 0 to 63, and $\cup$ is a union set operator.

For an implementation of the user equipment 300 and the user equipment 400, refer to an implementation of a method for sending a BSR in accordance with FIG. 3 to FIG. 6b.

Embodiments of the present application further provide a computer readable storage medium. The computer readable storage medium stores a computer instruction. When the instruction runs on a computer, the computer performs a method for sending a BSR in accordance with FIG. 3 to FIG. 6b.

The computer readable storage medium is configured to store a computer software instruction to be executed by the foregoing processor, and includes a program to be executed by the foregoing processor.

A person skilled in the art should understand that embodiments of this application may be provided as a method, a system, or a computer program product. Therefore, this application may use a form of hardware only embodiments, software only embodiments, or embodiments of a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to flowcharts and/or block diagrams of a method, a device (system), and a computer program product based on this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for sending a buffer status report (BSR), comprising:

generating, by a user equipment (UE), the BSR based on whether only one logical channel group (LCG) has data available for transmission or more than one LCG has data available for transmission, wherein:

in case only one LCG has data available for transmission, the generated BSR is a first type of BSR occupying one byte, wherein the first type of BSR comprises an LCG ID occupying 3 bits and a buffer index occupying 5 bits, the LCG ID indicates an LCG of eight LCGs, and the buffer index indicates an uplink buffer amount meeting $S_i = S_{2i}^{LTE} \cup S_{2i+1}^{LTE}$, where i is a value of the buffer index, i is an integer ranging from 0 to 31, $S_i$ indicates a respective uplink buffer amount corresponding to a respective value i of the buffer index, $S_j^{LTE}$ indicates a respective uplink buffer amount which is defined in the Long Term Evolution (LTE) protocol and corresponds to a respective buffer index value j, j is an integer ranging from 0 to 63, and $\cup$ is a union set operator; and in case more than one LCG has data available for transmission, the generated BSR is a second type of BSR occupying X bytes, wherein 8 bits of the first byte of the second type of BSR are in a one-to-one correspondence with eight LCGs, and the second type of BSR comprises one or more buffer indexes, wherein each buffer index of the one or more buffer indexes corresponds to a respective LCG, wherein each buffer index of the one or more buffer indexes indicates an amount of data available for transmission for the corresponding respective LCG, wherein a buffer index of one LCG occupies 8 bits of the second type of BSR, and wherein X is an integer ranging from 2 to 9; and sending, by the UE, the generated BSR to a network-side device.

2. The method according to claim 1, wherein each bit of the first byte indicates whether a corresponding LCG has data available for transmission.

3. The method according to claim 2, wherein the second type of BSR comprises a buffer index of each of K LCGs that has data available for transmission in the eight LCGs, and K is a positive integer.

4. The method according to claim 3, wherein the K buffer indexes corresponding to the K LCGs start from a second byte of the second type of BSR, and a sequence of the K buffer indexes is consistent with a sequence of bits in the first byte that correspond to the K LCGs.

5. The method according to claim 3, wherein K is less than or equal to 8.

6. The method according to claim 3, wherein X=K+1.

7. The method according to claim 2, wherein a value of a respective bit in the first byte of the second type of BSR being 0 indicates that an LCG corresponding to the bit does not have data available for transmission and a value of a respective bit in the first byte being 1 indicates that an LCG corresponding to the bit has data available for transmission.

8. The method according to claim 1, wherein each bit of the first byte indicates whether the second type of BSR comprises a buffer index of a corresponding LCG.

9. The method according to claim 8, wherein the second type of BSR comprises buffer indexes of K LCGs corresponding to K bits each indicating that the second type of BSR comprises a buffer index of a corresponding LCG, and K is a positive integer.

10. The method according to claim 9, wherein the K buffer indexes corresponding to the K LCGs start from a second byte of the second type of BSR, and a sequence of the K buffer indexes is consistent with a sequence of bits in the first byte that correspond to the K LCGs.

11. The method according to claim 8, wherein a value of a respective bit in the first byte of the second type of BSR being 1 indicates that an LCG corresponding to the bit has a buffer index and a value of a respective bit in the first byte being 0 indicates that an LCG corresponding to the bit does not have a buffer index.

12. The method according to claim 1, wherein the amount of data available for transmission is within a data amount range indicated by the buffer index.

13. A device, comprising a processor and a non-transitory memory having processor-executable instructions stored thereon, wherein the processor-executable instructions, when executed by the processor, facilitate:

generating a buffer status report (BSR) based on whether only one logical channel group (LCG) has data available for transmission or more than one LCG has data available for transmission, wherein:

in case only one logical channel group (LCG) has data available for transmission, the generated BSR is a first type of BSR occupying one byte, wherein the first type of BSR comprises an LCG ID occupying 3 bits and a buffer index occupying 5 bits, the LCG ID indicates an LCG of eight LCGs, and the buffer index indicates an uplink buffer amount meeting $S_i = S_{2i}^{LTE} \cup S_{2i+1}^{LTE}$, where i is a value of the buffer index, i is an integer ranging from 0 to 31, $S_i$ indicates a respective uplink buffer amount corresponding to a respective value i of the buffer index, $S_j^{LTE}$ indicates a respective uplink buffer amount which is defined in the Long Term Evolution (LTE) protocol and corresponds to a respective buffer index value j, j is an integer ranging from 0 to 63, and $\cup$ is a union set operator; and in case more than one LCG has data available for transmission, the generated BSR is a second type of BSR occupying X bytes, wherein 8 bits of the first byte of the second type of BSR are in a one-to-one correspondence with eight LCGs, and the second type of BSR comprises one or more buffer indexes, wherein each buffer index of the one or more buffer indexes corresponds to a respective LCG, wherein each buffer index of the one or more buffer indexes indicates an amount of data available for transmission for the corresponding LCG, wherein a buffer index of one LCG occupies 8 bits of the second type of BSR, and wherein X is an integer ranging from 2 to 9; and sending the generated BSR to another device.

14. The device according to claim 13, wherein each bit of the first byte indicates whether a corresponding LCG has data available for transmission.

15. The device according to claim 14, wherein the second type of BSR comprises a buffer index of each of K LCGs that has data available for transmission in the eight LCGs, and K is a positive integer.

16. The device according to claim 15, wherein the K buffer indexes corresponding to the K LCGs start from a second byte of the second type of BSR, and a sequence of the K buffer indexes is consistent with a sequence of bits in the first byte that correspond to the K LCGs.

17. The device according to claim 15, wherein K is less than or equal to 8.

18. The device according to claim 15, wherein X=K+1.

19. The device according to claim 14, wherein a value of a respective bit in the first byte of the second type of BSR being 0 indicates that an LCG corresponding to the bit does not have data available for transmission and a value of a respective bit in the first byte being 1 indicates that an LCG corresponding to the bit has data available for transmission.

20. The device according to claim 13, wherein each bit of the first byte indicates whether the second type of BSR comprises a buffer index of a corresponding LCG.

21. The device according to claim 20, wherein the second type of BSR comprises buffer indexes of K LCGs corresponding to K bits each indicating that the second type of BSR comprises a buffer index of a corresponding LCG, and K is a positive integer.

22. The device according to claim 21, wherein the K buffer indexes corresponding to the K LCGs start from a second byte of the second type of BSR, and a sequence of the K buffer indexes is consistent with a sequence of bits in the first byte that correspond to the K LCGs.

23. The device according to claim 20, wherein a value of a respective bit in the first byte of the second type of BSR being 1 indicates that an LCG corresponding to the bit has a buffer index and a value of a respective bit in the first byte being 0 indicates that an LCG corresponding to the bit does not have a buffer index.

24. The device according to claim 13, wherein the amount of data available for transmission is within a data amount range indicated by the buffer index.

25. A non-transitory memory having processor-executable instructions stored thereon, wherein the processor-executable instructions, when executed by a processor, facilitate:

generating a buffer status report (BSR) based on whether only one logical channel group (LCG) has data available for transmission or more than one LCG has data available for transmission, wherein:

in case only one logical channel group (LCG) has data available for transmission, the generated BSR is a first type of BSR occupying one byte, wherein the first type of BSR comprises an LCG ID occupying 3 bits and a buffer index occupying 5 bits, the LCG ID indicates an LCG of eight LCGs, and the buffer index indicates an uplink buffer amount meeting $S_i = S_{2i}^{LTE} \cup S_{2i+1}^{LTE}$, where i is a value of the buffer index, i is an integer ranging from 0 to 31, $S_i$ indicates a respective uplink buffer amount corresponding to a respective value i of the buffer index, $S_j^{LTE}$ indicates a respective uplink buffer amount which is defined in the Long Term Evolution (LIE) protocol and corresponds to a respective buffer index value j, j is an integer ranging from 0 to 63, and $\cup$ is a union set operator; and in case more than one LCG has data available for transmission, the generated BSR is a second type BSR occupying X bytes, wherein 8 bits of the first byte of the second type of BSR are in a one-to-one correspondence with eight LCGs, and the second type of BSR comprises one or more buffer indexes, wherein each buffer index of the one or more buffer indexes corresponds to a respective LCG, wherein each buffer index of the one or more buffer indexes indicates an amount of data available for transmission for the corresponding LCG, wherein a buffer index of one LCG occupies 8 bits of the second type of BSR, and wherein X is an integer ranging from 2 to 9; and sending the generated BSR.

* * * * *

UNITED STATES PATENT AND TRADEMARK OFFICE
CERTIFICATE OF CORRECTION

PATENT NO. : 10,887,790 B2
APPLICATION NO. : 16/410865
DATED : January 5, 2021
INVENTOR(S) : Li et al.

Page 1 of 1

It is certified that error appears in the above-identified patent and that said Letters Patent is hereby corrected as shown below:

On the Title Page

Page 2, item (56), Other Publications: Citation No. 12: "Huawel" should read -- Huawei --.

In the Claims

Claim 25: Column 16, Line 23: "which is defined in the Long Term Evolution (LIE)" should read -- which is defined in the Long Term Evolution (LTE) --.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*